United States Patent Office 2,834,868
Patented May 13, 1958

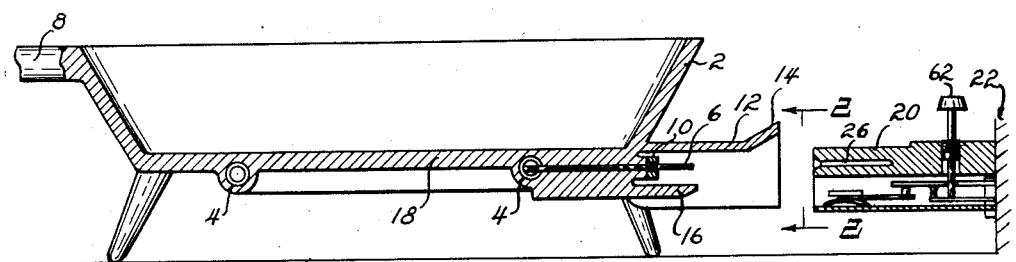
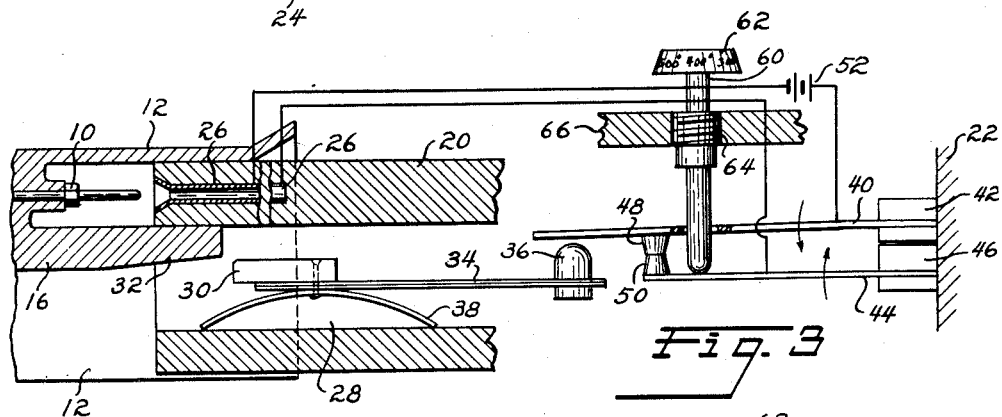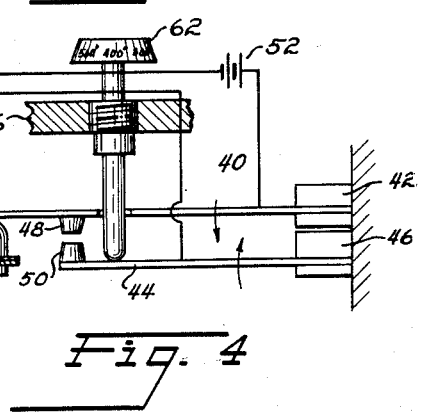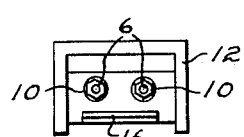

2,834,868

TEMPERATURE CONTROL SYSTEM FOR COOKING UTENSILS

William L. Greene, Annapolis, Md., and Henry A. Berliner, Washington, D. C.

Application March 19, 1956, Serial No. 572,318

2 Claims. (Cl. 219—43)

This invention relates broadly to the art of controlling the temperature of a cooking utensil and, more particularly, to the control of the temperature of a cooking utensil having built-in electrical resistance heating means.

Utensils such as skillets and the like, adapted for the cooking of food and having built-in electrical resistance heating elements are now available and well-known. It is desirable in the use and operation of these devices to control the temperature of the cooking utensil and maintain it at a constant predetermined value in order properly to cook different foods, and this is usually done in known devices by control means mounted directly on the utensil itself. However, in a household food cooking system now being developed, and parts of which are disclosed in the pending application of Henry A. Berliner, Serial No. 482,712 for Cooking Apparatus, it is preferable to provide temperature control and adjustment means disassociated and separate from the cooking utensil itself, in order that this control may be effected at a remote point such as the board or panel on which are located the electric sockets into which the contact plugs of the cooking utensil are inserted when it is desired to operate the utensil to cook food. It has accordingly been a principal object of the invention to provide such a remotely-operated temperature control and maintenance system with its attendant advantages, including the resultant simplification of the cooking utensil itself because of the removal of the temperature control device therefrom, and the provision of easily accessible means for controlling and adjusting the temperature of the utensil. It has been a further principal object of the invention to provide in combination with a temperature control means which is remote from the utensil whose temperature is to be controlled, heat transfer means carried by the utensil for communicating the temperature of the utensil to the control means upon connection of the utensil to the source of electric energy to energize the heating element of the utensil.

The invention is described in the following specification and illustrated in the accompanying drawings, in which:

Fig. 1 is a sectional view through a cooking utensil and the means for controlling its temperature;

Fig. 2 is a view taken on line 2—2 of Fig. 1, and

Fig. 3 is an enlarged view of parts of the utensil and temperature control means disclosed in Fig. 1, the parts being shown in their positions before being fully connected, and Fig. 4 is a view of the parts shown in Fig. 3 after being fully connected.

This invention has to do with cooking utensils such as skillets, pans, broilers and the like which are heated by electrical means such as a resistance or the like which is built into the utensil itself and, more specifically, has to do with the combination of such a utensil and means separate from the utensil for controlling the heating means in order to maintain the utensil at a predetermined temperature. A skillet 2 is illustrated in the drawing as typical of cooking utensils of the type to which the invention relates and has a built-in electrical resistance heating element 4 the terminals of which are connected to terminal plugs 6 which protrude substantially radially outwardly from the peripheral wall of the utensil at a point diametrically opposite the handle 8 of the utensil. The terminal plugs are threaded just outside the body of the utensil to receive nuts and washers 10 which prevent the entry of liquid into the cavity in which the heating element is positioned.

The pair of terminal plugs 6 is surrounded on its three sides by a guide member 12 which is preferably formed integrally with the body of the cooking utensil and extends therefrom in a direction parallel to the plugs. This member has three walls which lie, respectively, above and at both sides of the pair of terminal plugs, leaving the bottom open. These three walls extend substantially beyond the ends of the terminal plugs and at their outer ends are outwardly flared at 14 to facilitate the introduction of part of the temperature-control means into the passage formed by the walls of the member 12 in order properly and quickly to guide the terminal plugs into their respective sockets in the temperature-control means.

Beneath the terminal plugs and extending radially outwardly from the body of the utensil parallel to the plugs there is provided a heat transfer element 16 which is of substantial width and thickness and is an integral part of the bottom 18 of the cooking utensil, whereby its temperature is always the same as that of the bottom 18. This heat transfer element extends outwardly of the body of the cooking utensil to approximately the ends of the terminal plugs and is positioned between the side walls of the guide member 12.

The cooking utensil 2 which has been described is an entirely self-contained heating device which may be immersed in water or any other liquid without damage to its operating parts. It may be mounted for operation on any surface having adjacent thereto a pair of electrical outlets connected to a source of electrical energy and into which the terminal plugs may be inserted.

The invention provides means for energizing the heating element of the cooking utensil and controlling its temperature, which means are entirely external to the utensil itself. In the disclosed embodiment of the invention these means comprise a member 20 of the same (preferably rectangular) cross-sectional shape as the space within and defined by the guide member 12 of the cooking utensil, which protrudes from a wall 22 which is adjacent the surface 24 on which the cooking utensil rests. This member 20 is adapted to be received within the guide member 12 when the cooking utensil is pushed along the surface 24 toward the wall 22 and has formed within it two outlet sockets 26 which receive the terminal plugs 6 on the utensil, and also has formed within it an aperture 28 which is positioned and adapted to receive the heat transfer element 16.

Means are provided within the member 20 for controlling the temperature of the cooking utensil. Such means comprise heat transfer, or feeler, plate 30 which is positioned within the aperture 28 in the path of the heat transfer element 16 as that element is moved into the aperture. The heat transfer element 16 may have its lower leading edge beveled, as shown at 32, in order to cause that element to ride over the plate 30 and come into tight face-to-face engagement therewith. As shown in Fig. 3 the lower surface of the heat transfer element 16 is in full face-to-face contact with the upper surface of the feeler plate 30 when the terminal plugs 6 are fully inserted into the outlet sockets 26. The feeler plate 30 is mounted on one end of an elongated bi-metallic element 34 the other end of which has mounted on its upper side a contact button 36, the entire element being supported by a loading spring 38. The bi-metallic element is of known and conventional structure and operates to raise the button 36 when heated and lower it when cooled. The upper surface of button 36 engages the lower surface of one end of an elongated leaf spring 40 which is rigidly supported at its other end at 42. A second leaf spring 44 is disposed below the spring 40 and is rigidly supported at 46 at its end adjacent the supported end of spring 40. The two springs 40, 44 are formed of electrically conductive material and have facing electrical contact members 48, 50 on their lower and upper surfaces, respectively. Spring 40 is connected to one of the electrical outlet sockets 26 and spring 44 is connected to the other socket through the source 52 of electrical energy for energizing the cooking utensil. An adjusting means for varying the spacing between the two contacts 48, 50 carried by the springs 40, 44 is provided and comprises a shaft 60 having a knob 62 at its one end and at its other end extending through an opening in spring 40 and engaging the upper surface of spring 44. Between its ends the shaft is threaded at 64 and extends through a threaded aperture in a member 66, it being noted here that members 30, 42, 46 and 66 are fixed with respect to each other. Rotation of the shaft by knob 62 will cause longitudinal movement of it to move the spring 44 and its contact 50 toward or away from spring 40 and its contact 48.

In the use and operation of the described cooking utensil and its temperature control system, the utensil, when it is to be used, is pushed over the surface 24 toward the member 20 which is attached to and protrudes from the wall 22 and which has within it the electrical outlet sockets 26 and the aperture 28 for receiving the heat transfer element 16. The flared end 14 of the guide member 12 on the cooking utensil will receive the member 20 and as the utensil is pushed toward wall 22 the guide member 12 will move along the member 20 to guide the cooking utensil into the exact and proper position in which the terminal plugs 6 are received into the electrical outlet sockets 26 and the heat transfer member 16 is received within the aperture 28 of member 20 and comes to rest in tight face-to-face contact with the feeler plate 30. It will thus be seen that means are provided by the invention, which form part of the cooking utensil itself, for guiding the utensil to its proper position for connection to the source of electrical energy and for transferring the heat of the cooking utensil to the temperature control means which is permanently connected to the wall 22 and is separate and distinct from the utensil itself.

After connection of the cooking utensil to the source of electrical energy in the manner described the utensil may be heated to a predetermined temperature and maintained at that temperature by the means provided by the invention. In order to accomplish this the knob 62 is operated in reference to a temperature scale, causing the shaft 60 to be moved axially because of its threaded connection to the fixed member 66. Such axial movement of the shaft 60 will adjust the spacing of the leaf springs 40, 44 and the electrical contact members 48, 50 carried thereby and the spacing of such electrical contact members will therefore be proportionate to the desired temperature to which the cooking utensil is to be heated. If the cooking utensil is initially below this predetermined desired temperature its connection to the source of electrical energy will cause its temperature to increase and this increase in temperature will be transmitted from the heat transfer element 16 of the cooking utensil to the feeler plate 30 of the temperature control device and consequently to the bi-metallic element 34 causing the same to lift the button 36. When the heating element is cold the bi-metallic element is in such a position and condition that the button 36 which is carried by it is well below the end of leaf spring 40 and in this condition of the parts the electrical contact members 48, 50 are in engagement with each other. As the temperature of the utensil increases the button 36 will rise toward the leaf spring 40 and when the temperature has increased to a predetermined value, which is that to which the knob 62 has been set, the button will engage leaf spring 40 and raise it, causing the electrical contacts 48, 50 to operate and thereby open the circuit which connects the electrical outlet sockets 26 to the source of electrical energy 52. This will cause the cooking utensil to cool and the reduction in its temperature will be transmitted to feeler plate 30 and bimetallic element 34, thus causing the button 36 to move downwardly away from the leaf spring 40. This will cause electrical contact 48 to again come into engagement with contact 50 thereby again supplying electrical energy to the outlet plugs 26 to again energize the heating element of the cooking utensil. In this way, the temperature of the cooking utensil is maintained constantly at the value to which the knob 62 has been set.

While we have described and illustrated one embodiment of our invention, it will be apparent to those skilled in the art to which the invention relates that other embodiments, as well as modifications of that disclosed, may be made and practised without departing from the spirit or scope of the invention, for the limits of which reference must be made to the appended claims.

What is claimed is:

1. Cooking apparatus comprising a cooking utensil having electrical heating means built into it, external electrical contact plugs on said utensil connected to the heating means, a heat transfer member formed integrally with the cooking utensil and extending outwardly therefrom adjacent said contact plugs, a guide member connected to the cooking utensil and at least partially surrounding the contact plugs and the heat transfer member, a connecting member having a cross-sectional shape corresponding to that of the guide member and being separate from the cooking utensil and having sockets therein connected to a source of electricity to receive said terminal plugs, temperature control means associated with said connecting member and responsive to variation from a predetermined temperature to open the connection of said sockets to the source of electricity, and means within said connecting member positioned to be engaged by said heat transfer member upon insertion of the terminal plugs into the sockets for transferring the heat of the cooking utensil to the temperature control means.

2. A cooking utensil comprising a body portion within which food is adapted to be cooked, an electrical heating element within the body of said utensil, electrical contact plugs extending outwardly from the body of said utensil and connected to the terminals of said heating element, and a heat transfer member comprising a metal piece integrally formed with the body of said utensil and extending outwardly therefrom adjacent and substantially parallel to said contact plugs and spaced therefrom and an open-ended guide member extending outwardly from the body of said utensil and at least partially surrounding said contact plugs and heat transfer member.

References Cited in the file of this patent

UNITED STATES PATENTS

| | | |
|---|---|---|
| 1,431,542 | Ross | Oct. 10, 1922 |
| 1,481,233 | Sieben | Jan. 15, 1924 |
| 1,662,817 | Bollman | Mar. 20, 1928 |
| 1,780,631 | Peterson | Nov. 4, 1930 |
| 1,813,267 | Arnesen | July 7, 1931 |
| 2,020,110 | Duvall | Nov. 5, 1935 |
| 2,058,068 | Duvall | Oct. 20, 1936 |
| 2,712,055 | Campbell | June 28, 1955 |

FOREIGN PATENTS

| | | |
|---|---|---|
| 725,341 | Great Britain | Mar. 2, 1955 |